United States Patent [19]
Lambrecht et al.

[11] Patent Number: 6,035,364
[45] Date of Patent: *Mar. 7, 2000

[54] INDEPENDENT USE OF BITS ON AN ON-CHIP BUS

[75] Inventors: J. Andrew Lambrecht; Scott E. Swanstrom, both of Austin, Tex.

[73] Assignee: Advanced Micro Devices, Inc., Sunnyvale, Calif.

[*] Notice: This patent is subject to a terminal disclaimer.

[21] Appl. No.: 08/989,330

[22] Filed: Dec. 11, 1997

Related U.S. Application Data

[63] Continuation-in-part of application No. 08/926,729, Sep. 10, 1997, Pat. No. 5,872,942, and a continuation-in-part of application No. 08/989,329, Dec. 11, 1997, which is a continuation-in-part of application No. 08/926,729, Sep. 10, 1997, Pat. No. 5,872,942, which is a continuation of application No. 08/650,939, May 17, 1996, Pat. No. 5,790,815, which is a continuation of application No. 08/559,661, Nov. 20, 1995, Pat. No. 5,754,807, said application No. 08/989,329, Dec. 11, 1997, is a continuation-in-part of application No. 08/559,661, Nov. 20, 1995, Pat. No. 5,754,807, said application No. 08/926,729, Sep. 10, 1997, is a continuation of application No. 08/650,939, May 17, 1996, Pat. No. 5,790,815, which is a continuation of application No. 08/559,661, Nov. 20, 1995, Pat. No. 5,754,807.

[51] Int. Cl.[7] .................................................. G06F 13/38
[52] U.S. Cl. .......................................... 710/129; 710/126
[58] Field of Search ................................... 710/126, 127, 710/128, 129

[56] References Cited

U.S. PATENT DOCUMENTS

| | | | |
|---|---|---|---|
| 4,641,247 | 2/1987 | Laugesen et al. | 364/490 |
| 4,698,753 | 10/1987 | Hubbins et al. | 364/200 |
| 5,170,252 | 12/1992 | Gear et al. | |
| 5,241,632 | 8/1993 | O'Connell et al. | |
| 5,487,167 | 1/1996 | Dinallo et al. | |
| 5,623,344 | 4/1997 | Lane et al. | |
| 5,682,484 | 10/1997 | Lambrecht | |
| 5,754,801 | 5/1998 | Lambrecht et al. | |
| 5,754,807 | 5/1998 | Lambrecht et al. | |
| 5,761,516 | 6/1998 | Rostoker et al. | 395/733 |
| 5,790,815 | 8/1998 | Swanstrom et al. | 395/309 |
| 5,872,942 | 2/1999 | Swanstrom et al. | 395/309 |

OTHER PUBLICATIONS

Microsoft Press Computer Dictionary, Second Edition, p. 110, 1994.

*Primary Examiner*—Ayaz R. Sheikh
*Assistant Examiner*—Jigar Pancholi
*Attorney, Agent, or Firm*—Conley, Rose & Tayon, P.C.; Eric A. Stephenson; Louis H. Iselin

[57] ABSTRACT

A computer chip including multiple on-chip modules connected by an on-chip bus which provides increased performance over current computer chip architectures. The on-chip system bus is a bit sliced bus. Various transmitters/and or receivers are coupled the bit sliced bus. The transmitters and/or receivers include bus interface logic and/or bit transfer logic and/or bit receive logic operatively coupled to the on-chip bit sliced bus which operates to allow different data streams to use different bit lines substantially simultaneously. Thus the bit sliced bus allows different devices to share the bus simultaneously. The bus interface logic and/or the bit transfer logic thus may assign one data stream to a subset of the total bit lines on the bit sliced bus, and fill the unused bit lines with another data stream.

43 Claims, 7 Drawing Sheets

| BYTE LANE 1 | C<br>S1, D1 | S1, B1<br>D1 | S1, B3<br>D1 | S1, B5<br>D1 | S1, B7<br>D1 | C<br>S1, D1 | S1, B9<br>D1 | S1, B10<br>D1 | S1, B11<br>D1 | S1, B12<br>D1 | C<br>S1, D1 | S1, B13<br>D1 |
|---|---|---|---|---|---|---|---|---|---|---|---|---|
| BYTE LANE 2 | C<br>S1, D1 | S1, B2<br>D1 | S1, B4<br>D1 | S1, B6<br>D1 | S1, B8<br>D1 | C<br>S6, D6 | S6, B1<br>D6 | S6, B2<br>D6 | S6, B3<br>D6 | S6, B4<br>D6 | C<br>S6, D6 | S6, B5<br>D6 |
| BYTE LANE 3 | C<br>S2, D2 | S2, B1<br>D2 | S2, B2<br>D2 | S2, B3<br>D2 | S2, B4<br>D2 | C<br>S2, D2 | S2, B5<br>D2 | X | X | X | C<br>S4, D2 | S4, B1<br>D2 |
| BYTE LANE 4 | C, S3<br>D3, D4 | S3, B1<br>D3, D4 | S3, B2<br>D3, D4 | S3, B3<br>D3, D4 | S3, B4<br>D3, D4 | C, S3,<br>D3, D4 | S3, B5<br>D3, D4 | S3, B6<br>D3, D4 | S3, B7<br>D3, D4 | X | C<br>S3, D5 | S3, B1<br>D5 |
| | T1 | T2 | T3 | T4 | T5 | T6 | T7 | T8 | T9 | T10 | T11 | T12 |

C=CONTROL CODES, S=SOURCE, D=DESTINATION, B=BYTE, T=TRANSFER, X-NO DATA

FIG. 6

INDEPENDENT USE OF BITS ON AN ON-CHIP BUS

CONTINUATION DATA

This is a continuation-in-part of application Ser. No. 08/926,729 titled "Computer System Having A Multimedia Bus and Comprising a Centralized I/O Processor which Performs Intelligent Byte Slicing" filed Sep. 10, 1997, now U.S. Pat. No. 5,872,942, whose inventors are Scott Swanstrom and Steve L. Belt, which is a continuation of application Ser. No. 08/650,939, now U.S. Pat. No. 5,790,815, filed May 17, 1996, which is a continuation of application Ser. No. 08/559,661, now U.S. Pat. No. 5,754,807, filed Nov. 20, 1995.

This is also a continuation-in-part of co-pending application Ser. No. 08/989,329 titled "Computer System which Performs Intelligent Byte Slicing on a Multi-Byte Wide Bus" filed Dec. 11, 1997, whose inventors are Drew J. Dutton, Scott E. Swanstrom and J. Andrew Lambrecht, which is a continuation-in-part of application Ser. No. 08/926,729, now U.S. Pat. No. 5,872,942, filed Sep. 10, 1997, which is a continuation of application Ser. No. 08/650, 939, now U.S. Pat. No. 5,790,815, filed May 17, 1996, which is a continuation of application Ser. No. 08/559,661, now U.S. Pat. No. 5,754,807, filed Nov. 20, 1995. Application Ser. No. 08/989,329 is also a continuation-in-part of application Ser. No. 08/559,661, now U.S. Pat. No. 5,754, 807, filed Nov. 20, 1995.

FIELD OF THE INVENTION

The present invention is related to semiconductor integrated circuits, and more particularly to a system of modules or devices which perform independent transfers of data on separate bit lines of an on-chip bus on an integrated circuit in an on-chip network for increased system performance.

DESCRIPTION OF THE RELATED ART

Computer systems have traditionally comprised a system unit or housing which comprises a plurality of electrical components comprising the computer system. A computer system typically includes a motherboard which is configured to hold the microprocessor and memory and the one or more busses used in the computer system. The motherboard typically comprises a plurality of computer chips or electrical components including intelligent peripheral devices, bus controllers, processors, bus bridges, etc.

More recently, computer systems are evolving toward an integration of functions into a handful of computer chips. This coincides with the ability of chip makers to place an increasingly large number of transistors on a single chip. For example, currently chip manufacturers are able to place in excess of 50 million transistors on a single integrated circuit or monolithic substrate. It is anticipated that within several years chip makers will be able to place more than 500 million transistors on a single chip. Thus, computer systems are evolving toward comprising a handful of computer chips, where each computer chip comprises a plurality of functions. Therefore, an improved system and method is desired for interconnecting a plurality of different functions or modules on a single chip integrated circuit.

SUMMARY OF THE INVENTION

The present invention comprises an on-chip bit sliced bus including a plurality of data lines, where each of the data lines is operable to carry a data bit. One or more transmitters couple to the on-chip bit sliced bus and are operable for transmitting data on the on-chip bit sliced bus. One or more receivers also couple to the on-chip bit sliced bus and are preferably operable for receiving data transferred on the on-chip bit sliced bus. The on-chip bit sliced bus preferably includes a 32 or 64 bit data path or larger and may also include address and control lines or portions.

Each of the one or more transmitters preferably perform operations on the on-chip bit sliced bus, and each of the one or more transmitters includes bus interface logic for accessing the on-chip bit sliced bus and performing data transfers on the on-chip bit sliced bus. The bus interface logic is preferably further operable to selectively assign data streams on selected one or more or pluralities of data lines comprising the on-chip bit sliced bus. Each of the one or more transmitters also includes bit transfer logic which operatively couples to the on-chip bit sliced bus. The bit transfer logic for each transmitter operates to selectively assign data streams on selected ones of the data lines comprising the on-chip bit sliced bus. Each of the one or more receivers includes bit receive logic operable to receive the assigned data streams on the selected ones of the data lines comprising the on-chip bit sliced bus. Preferably the computer chip comprises one or more devices which operate as both transmitters and receivers.

The data lines of the bit sliced bus preferably include one or more of the data lines useable as control lines to identify the selected ones of the data lines comprising the on-chip bit sliced bus which are used for data transfers. The on-chip bit sliced bus further preferably comprises a plurality of control lines, wherein each of the control lines is operable to carry a control signal. The control signals are used to identify the selected ones of the data lines comprising the on-chip bit sliced bus which are used for data transfers. Preferably, one or more of the control lines are also useable as data lines to carry data bits. Although the on-chip bit sliced bus is preferably a parallel bus, the plurality of control lines preferably also includes one or more serial control lines for indicating data transfers on single data lines of the on-chip bit sliced bus. The control lines preferably including one or more of: Clear to Send, Ready and Clock control lines, particular control lines normally associated with a serial bus.

Two or more transmitters are preferably operable to set up data transfers on different selected data lines of the on-chip bit sliced bus in a synchronous fashion, that is, the two or more transmitters are operable to transfer data bits on the different selected data lines substantially simultaneously in a synchronous fashion. A first transmitter is preferably operable to set up data transfers on first selected one or more data lines of the on-chip bit sliced bus while a second transmitter is operable to set up data transfers on second selected one or more data lines of the on-chip bit sliced bus. The first transmitter and the second transmitter are preferably operable to transfer data bits on the first and second selected data lines, respectively, in a synchronous fashion or an asynchronous fashion. The first transmitter is preferably operable to transfer video data on the first selected data lines, and the second transmitter is preferably operable to transfer audio data on the second selected data lines. The first transmitter is further preferably operable to transfer data bits on the first selected data lines at a first speed while the second transmitter is operable to transfer data bits on the second selected data lines at a second speed, wherein the second speed is different than the first speed. The first transmitter is preferably operable to transfer video data on the first selected data lines, and the second transmitter is operable to transfer audio data on the second selected data lines.

In another embodiment, a first transmitter comprising bit transfer logic transmits one or more control signals on one or more control lines to set up a data transfer using only first selected data lines of the on-chip bit sliced bus. The first selected data lines preferably comprise only a subset of the plurality of data lines comprising the on-chip bit sliced bus. A first receiver comprising bit receive logic receives the one or more control signals on one or more control lines. The first transmitter transmits data on the first selected data lines of the on-chip bit sliced bus after transmitting the signal on the one or more control lines to set up the data transfer. The first receiver receives the transmitted data on the first selected data lines of the on-chip bit sliced bus in response to the transmission.

In another embodiment, a second transmitter comprising bit transfer logic also transmits additional one or more control signals on one or more control lines to set up a data transfer using only second selected data lines of the on-chip bit sliced bus. As before, the second selected data lines comprise only a second subset of the plurality of data lines comprising the on-chip bit sliced bus. A second receiver comprising bit receive logic receives the additional one or more control signals on additional one or more control lines. The second transmitter transmits data on the second selected data lines of the on-chip bit sliced bus after the transmitting the signal on the additional one or more control lines to set up the data transfer. The second receiver receives the transmitted data on the second selected data lines of the on-chip bit sliced bus in response to the transmission.

BRIEF DESCRIPTION OF THE DRAWINGS

A better understanding of the present invention can be obtained when the following detailed description of the preferred embodiment is considered in conjunction with the following drawings, in which:

FIGS. 6 and 7 are block diagrams of traffic on multiple data bit lines over a period of time according to the present invention.

Figure 1:
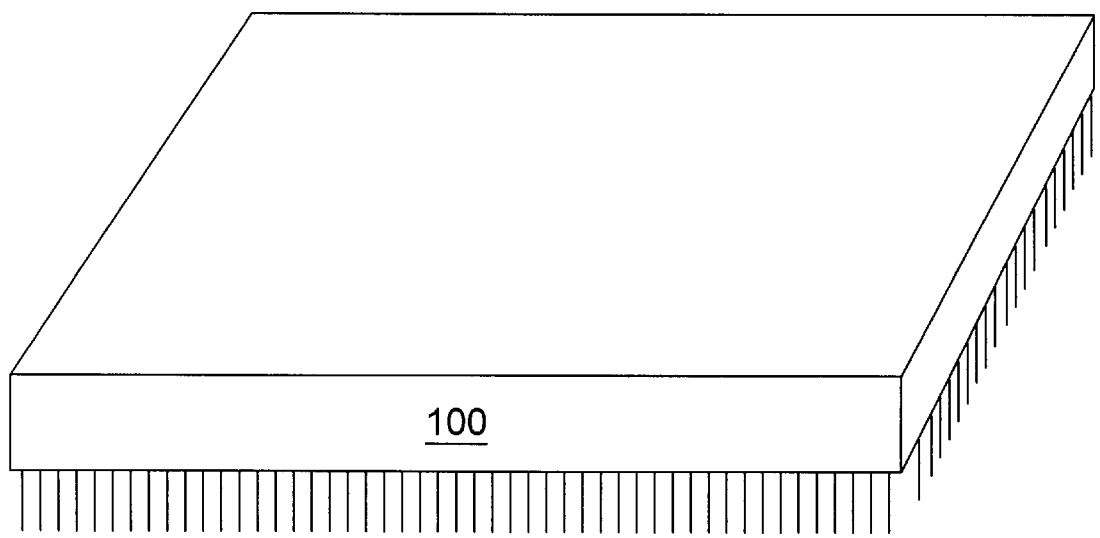
FIG. 1 illustrates a perspective view of a computer chip having an on-chip network.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF THE PREFERRED EMBODIMENT

Incorporation by Reference

Co-pending application Ser. No. 08/892,415 entitled "Flexible Buffering Scheme for Inter-Module On-Chip Communications" filed Jul. 14, 1997 (Docket No. 5000-95900), whose inventor is Alfred C. Hartmann, and co-pending application Ser. No. 08/989,329 titled "Computer System Which Performs Intelligent Byte Slicing on a Multi-Byte Wide Bus" filed Dec. 11, 1997 (Docket No. 5000-35000), whose inventors are Drew J. Dutton, Scott E. Swanstrom and J. Andrew Lambrecht, are hereby incorporated by reference in their entirety.

Definitions

For the purpose of this disclosure, the following words or phrases shall have the additional meanings:

"transmitter"—a combination of one or more inter-module ports 220 and an associated module 210 with the combination comprising bus interface logic 360 and bit transfer logic 380;

"receiver"—a combination of one or more inter-module ports 220 and an associated module 210 with the combination comprising bus interface logic 360 and bit receive logic 370;

"A operatively coupled to B"—A and B are connected either directly or through one or more intervening other items and are capable of communication by one or more various means, such as electrical, optical or mechanical;

"substantially simultaneously"—two or more event occurring in whole or in part at the same time or so closely together in time that the difference in time is less than ten per cent of the total time for the longer event of the two or more events; and "bit"—all possible granularities of the bit sliced bus from a single bit to the entire width of the bit sliced bus.

The present invention comprises a single chip integrated circuit including a plurality of modules interconnected by a bit sliced bus in an on-chip network.

FIG. 1—Computer Chip

Referring now to FIG. 1, a computer chip 100 is shown from a perspective view. Computer chip 100 preferably comprises a monolithic silicon substrate comprising a plurality of transistors, according to the present invention. The computer chip may also use gallium arsenide (GaAs) or another suitable semiconductor material. Although shown as a ceramic socket mount pin grid array (PGA) package, the computer chip 100 may be packaged in any of various ways, including as a surface mount, socket mount, or insertion/socket mount. Materials used in the packaging of computer chip 100 may include ceramic packages, leadless chip carrier packages (LCC), glass-sealed packages, or plastic packages. Actual type of chip package for computer chip 100 may include, ceramic quad flatpack (CQFP), PGA, ceramic dual in-line package (C-DIP), LCC socket or surface mount, ceramic dual in-line package (CERDIP), ceramic quadpack (CERQUAD), small outline package gull wing (SOP), small outline package J-lead (SOJ), thin small outline package (TSOP) etc. and may have any of various types of connectivity including pin grid array (PGA), ball grid array (BGA), direct chip attach (DCA), metal bands or pins etc. Also usable is the controlled collapse chip connection (C4) method, commonly known as the "flip chip" method.

Computer chip 100 utilizes a generic method for interconnecting multiple module types on a single computer chip 100 using intelligent buffering and a universal port design. Connecting each module to a communications pathway with a full duplex, general purpose communications port allows for heterogeneous and homogeneous module types to form a networked system on a single computer chip. The present invention allows "system on a chip" producers to integrate module designs from different sources or module core vendors. This promotes integration of "best of breed" cores from an evolving industry of "virtual component" suppliers.

Figure 2:
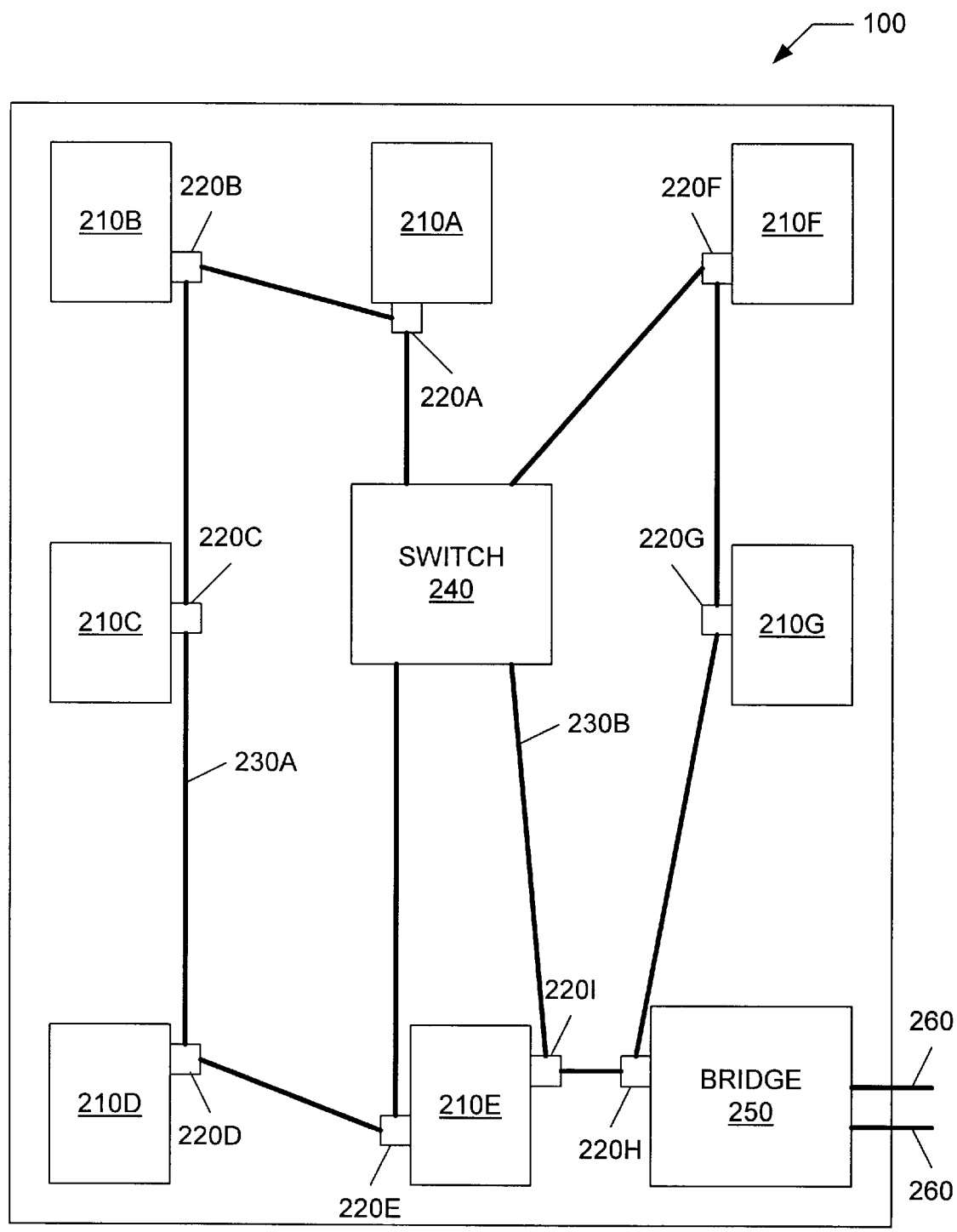
FIG. 2 illustrates an embodiment of the on-chip network shown in FIG. 1.

FIG. 2—On-Chip Network

Referring now to FIG. 2, an embodiment is shown of computer chip 100 with an on-chip system for interconnecting a plurality of modules 210A–210G on a single computer chip 100 in an on-chip network. When a reference is made to module 210, that reference may refer to any of the modules 210A–210G. The components of the network include one or more inter-module links, also referred to operatively as bit sliced buses, 230A–230B which provide an electrical path for data communications between the plurality of modules 210 comprised on the computer chip 100. The bit sliced buses 230A–230B include a plurality of bit lines for transmission of data, such as 32 bits, 64 bits, 128 bits, 256 bits, etc. When a reference is made to bit sliced bus 230, that reference may refer to any part associated with bit sliced bus 230, including those labeled as 230A and 230B.

The modules 210 preferably perform operations, and modules may be devices such as a processor, an I/O controller, or storage (memory), or a hybrid of tasks, like a task-specific hybrid (or ASIC) or a task-general hybrid. The modules 210 may also be any of various types of input/output devices, including multimedia devices and communication devices. For example, the modules 210 may comprise video accelerator or graphics accelerator devices, video playback devices, MPEG encoder or decoder devices, sound devices, network interface devices, SCSI adapters for interfacing to various input/output devices, such as CD-ROMS and tape drives, or other devices as desired. An individual module 210 may also include two or more or the above devices or abilities. At least one inter-module port 220 is coupled between an associated module 210 and the bit sliced bus 230.

An inter-module network switch 240 is comprised on computer chip 100 which joins the bit sliced bus 230. An inter-chip network bridge 250 is comprised on computer chip 100 which is capable of joining two computer chips to extend the on-chip network through connectors 260. Bit sliced bus 230A combines to form a complete circuit among the inter-module ports 220A–220E through inter-module network switch 240, and bit sliced bus 230B combines to form a complete circuit among the inter-module ports 220F–220I also through inter-module network switch 240. In addition, the inter-module network switch 240 joins the two bit sliced buses 230A and 230B.

Starting at the top center of FIG. 2 and moving counter-clockwise, modules 210A–210E, each with associated module 220A–220E, are electrically connected in an on-chip communications network by bit sliced bus 230A. The communications circuit is completed by inter-module network switch 240 in the center of the computer chip 100. The inter-module network switch 240 also completes a second communications circuit involving bit sliced bus 230B. The on-chip communications network includes, moving clockwise from the top center again, modules 210F–210G, with associated inter-module ports 220F–220G, followed by inter-chip network bridge 250 coupled to the on-chip network by associated inter-module port 220H and a second connection to module 210E via inter-module port 220I. Bit sliced bus 230B to inter-module network switch 240 from inter-module port 220I completes the circuit.

Some modules 210, like special case module 210E, may be connected to more than one bit sliced bus 230 via multiple inter-module ports 220, as shown by the connection of module 210E to bit sliced bus 230A via inter-module port 220E and to bit sliced bus 230B via inter-module port 220I.

The plurality of inter-module ports 220 provide a common interface to each of their associated modules 210. The inter-module port 220 is universal so that any design of module 210 of any type may be connected to any of the inter-module ports 220. Furthermore, the inter-module ports 220 preferably operate to (i) receive data from the bit sliced bus 230, (ii) determine if the data from the bit sliced bus 230 is addressed to the associated module 210, (iii) provide the data from the bit sliced bus 230 to the associated module 210 if the inter-module port 220 determines that the data from the bit sliced bus 230 is addressed to the associated module 210, (iv) accept data from the associated module 210 for transmission on the bit sliced bus 230, and (v) transmit the data from the associated module 210 on the bit sliced bus 230.

The on-chip bit sliced bus 230 comprises a plurality of data lines, and each of the data lines is operable to carry a data bit. One or more transmitters couple to the on-chip bit sliced bus 230 and are operable for transmitting data on the on-chip bit sliced bus 230. One or more receivers also couple to the on-chip bit sliced bus 230 and are preferably operable for receiving data transferred on the on-chip bit sliced bus 230. The on-chip bit sliced bus 230 preferably includes a 32 or 64 bit data path and may also include address and control lines or portions.

Each of the one or more transmitters preferably perform operations on the on-chip bit sliced bus 230, wherein each of the one or more transmitters includes bus interface logic 360 (described in more detail in relation to FIG. 3, below) for accessing the on-chip bit sliced bus 230 and performing data transfers on the on-chip bit sliced bus 230. The bus interface logic 360 is preferably further operable to selectively assign data streams on selected pluralities of data lines comprising the on-chip bit sliced bus 230. Each of the one or more transmitters also includes bit transfer logic 380 (described in more detail in relation to FIG. 3, below) which operatively couples to the on-chip bit sliced bus 230. The bit transfer logic 380 for each transmitter operates to selectively assign data streams on selected ones of the data lines comprising the on-chip bit sliced bus 230. Each of the one or more receivers includes bit receive logic 370 operable to receive the assigned data streams on the selected ones of the data lines comprising the on-chip bit sliced bus 230. Preferably the computer chip comprises one or more devices which operate as both transmitters and receivers.

The data lines of the bit sliced bus 230 preferably include one or more of the data lines useable as control lines to identify the selected ones of the data lines comprising the on-chip bit sliced bus 230 which are used for data transfers. The on-chip bit sliced bus 230 further preferably comprises a plurality of control lines, wherein each of the control lines is operable to carry a control signal. The control signals are used to identify the selected ones of the data lines comprising the on-chip bit sliced bus 230 which are used for data transfers. Preferably, one or more of the control lines are also useable as data lines to carry data bits. Although the on-chip bit sliced bus 230 is preferably a parallel bus, the plurality of control lines preferably also includes one or more serial control lines for indicating data transfers on single data lines of the on-chip bit sliced bus 230. The control lines preferably including one or more of: Clear to Send, Ready and Clock control lines, particular control lines normally associated with a serial bus. Also included may be Data, Bus Request and/or Bus Grant, or similar control lines as desired.

Two or more transmitters are preferably operable to set up data transfers on different selected data lines of the on-chip bit sliced bus 230 in a synchronous or concurrent fashion, that is, the two or more transmitters are operable to transfer data bits on the different selected data lines substantially simultaneously in a synchronous or concurrent fashion. A first transmitter is preferably operable to set up data transfers on first selected one or more data lines of the on-chip bit sliced bus 230 while a second transmitter is operable to set up data transfers on second selected one or more data lines of the on-chip bit sliced bus 230. The first transmitter and the second transmitter are preferably operable to transfer data bits on the first and second selected data lines, respectively, in a synchronous or concurrent fashion. The first transmitter is preferably operable to transfer video data on the first selected data lines, and the second transmitter is preferably operable to transfer audio data on the second selected data lines.

In addition, a first transmitter is preferably operable to set up data transfers on first selected one or more data lines of the on-chip bit sliced bus 230, a second transmitter is preferably operable to set up data transfers on second selected one or more data lines of the on-chip bit sliced bus 230, and the first transmitter and the second transmitter are operable to transfer data bits on the first and second selected data lines, respectively, in an asynchronous fashion. The first transmitter is further preferably operable to transfer data bits on the first selected data lines at a first speed while the second transmitter is operable to transfer data bits on the second selected data lines at a second speed, wherein the second speed is different than the first speed. The first transmitter is preferably operable to transfer video data on the first selected data lines, and the second transmitter is operable to transfer audio data on the second selected data lines.

Although the bit sliced bus 230 is preferably described in terms of one or more bit lines, it is noted that other granularities of the bus are contemplated. These granularities include bits, nibbles (4 bits), bytes (8 bits), words (16 bits), dwords (32 bits) or combination thereof. The bus interface logic 360 may also slice one or more individual bits of the bus in a serial manner, creating one or more serial channels, in combination with the above.

Figure 3:
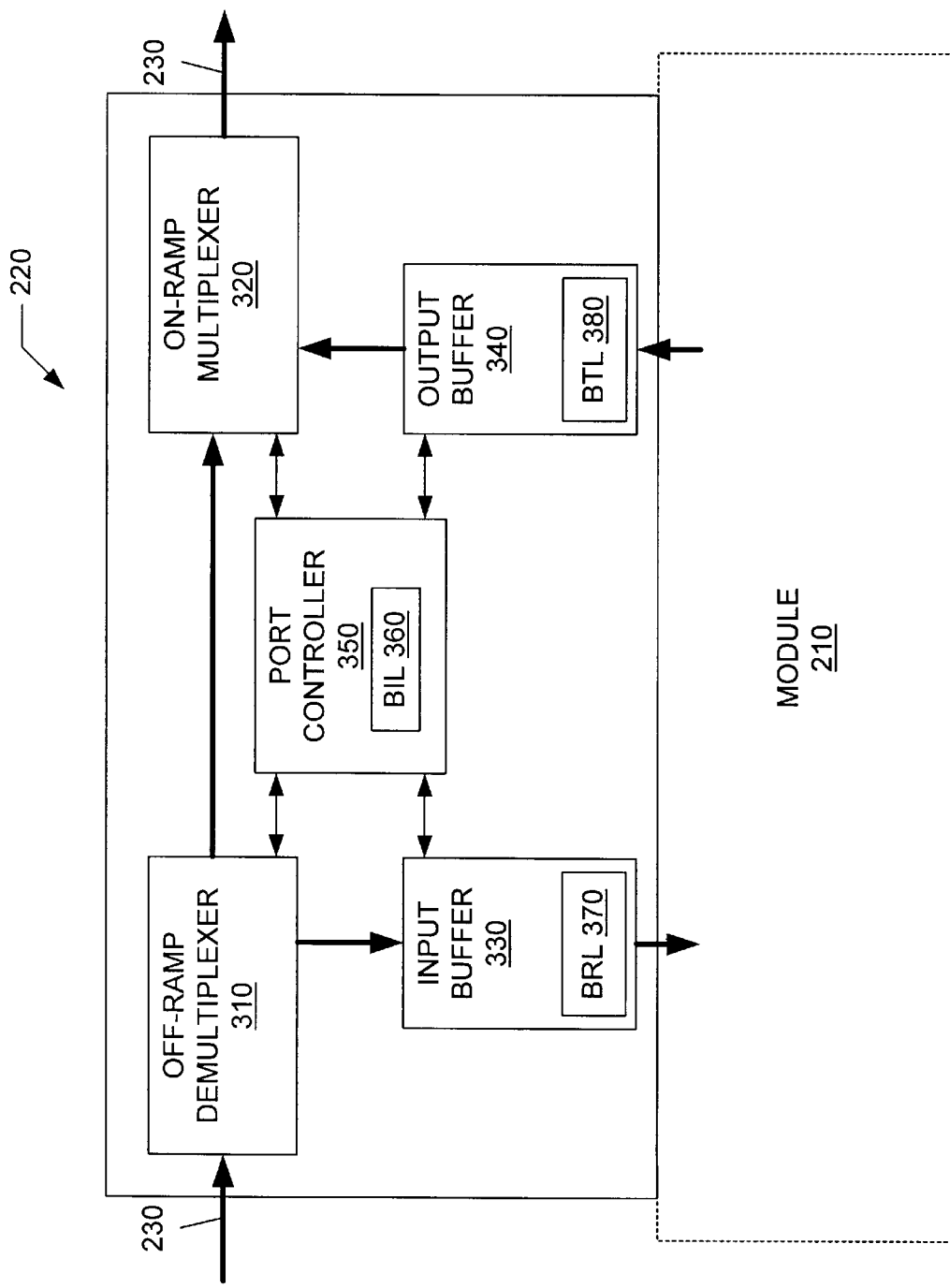
FIG. 3 illustrates an inter-module port according to the present invention.

FIG. 3—Inter-Module Port

Referring now to FIG. 3, an embodiment is shown of the internal details of an inter-module port 220 for coupling a module 210 comprised on a computer chip 100 to an bit sliced bus 230 for receiving and sending communications between one or more additional modules 210 comprised on the computer chip 100. The inter-module port 220 preferably includes an off-ramp demultiplexer 310 for coupling to the bit sliced bus 230 providing for the off-ramp demultiplexer 310 receiving data from the bit sliced bus 230. An on-ramp multiplexer 320 preferably couples to the bit sliced bus 230 and provides data onto the bit sliced bus 230. The on-ramp multiplexer 320 further couples to the off-ramp demultiplexer 310, and the off-ramp demultiplexer 310 operates to provide data to the on-ramp multiplexer 320. An input buffer 330 preferably couples to the off-ramp demultiplexer 310, and the input buffer 330 includes connections (not shown) for coupling to the module 210. An output buffer 340 preferably couples to the on-ramp multiplexer 320, and the output buffer 340 also includes connections (not shown) for coupling to the module 210.

The off-ramp demultiplexer 310 operates to receive data from the bit sliced bus 230 and demultiplex a portion of the data intended for the module 210 and provide the portion of the data intended for the module 210 to the input buffer 330. The input buffer 330 operates to receive and store the portion of the data intended for the module 210 and provide the portion of the data intended for the module 210 to the module 210 as the module 210 signals a readiness to accept the data. The output buffer 340 operates to receive and store output data from the module 210 and provide the data from the module 210 to the on-ramp multiplexer 320. The on-ramp multiplexer 320 operates to receive the output data from the module 210 and multiplex the data from the module 210 with other data received from the off-ramp demultiplexer 310 to form multiplexed data. The on-ramp multiplexer 320 further operates to provide the multiplexed data to the bit sliced bus 230.

The inter-module port 220 preferably also includes a port controller 350 coupled to control the operations of the off-ramp demultiplexer 310, the on-ramp multiplexer 320, the input buffer 330, and the output buffer 340. The means of port controller 350 may also be incorporated within the other individual components of the inter-module port 220 as desired. The preferred operation of the port controller 350 includes providing the control signals indicating which bits from bus 230 must be pulled off by the off-ramp multiplexer and which bits of data from output buffer 340 must be placed on bus 230. The port controller 350 provides these signals to each of the off-ramp demultiplexer 310, the on-ramp multiplexer 320, the input buffer 330, and the output buffer 340. The port controller 350 also preferably includes bus interface logic 360.

As each module 210 preferably includes a unique address, the port controller 350 preferably further operates to receive addresses of received data from the off-ramp demultiplexer 310 and determine if the unique address of the module 210 is present. The port controller 350 then operates to direct the off-ramp demultiplexer 310 to provide data associated with the unique address of the module 210 to the input buffer 330 if the port controller 350 determines that the unique address of the module 210 is present. Alternatively, the address decoding logic is comprised in the off-ramp demultiplexer 310, or in specialized address decoding logic coupled to the off-ramp demultiplexer 310.

Bus interface logic 360 for accessing the on-chip bit sliced bus 230 and performing data transfers on the on-chip bit sliced bus 230 is preferably comprised in port controller 350 but may also be comprised in off-ramp demultiplexer 310, on-ramp multiplexer 320 or another component comprised in module 210 or inter-module port 220. Bus interface logic 360 may also be separate from other parts of module 210 or inter-module port 220. Bit receive logic 370 is preferably comprised in input buffer 330 but, like bus interface logic 360, may also be comprised in another component or separate unto itself. Likewise, the output buffer 240 preferably includes bit transfer logic 380. Bit transfer logic 380 may also be positioned in any portion or other component of module 210 or inter-module port 220, as desired.

Preferably, the bit transfer logic comprised in each of the one or more transmitters comprises: one or more data registers for storing data operatively coupled to the on-chip bit sliced bus 230 which operates to output data to the selected data lines comprising the on-chip bit sliced bus 230, and one or more shift registers coupled to the one or more data registers for storing data and for outputting data to the one or more data registers. Each of the one or more shift registers is operable to output data in a format corresponding to a number of the selected data lines being used for the transfer.

Preferably the bit receive logic 380 comprised in each of the one or more receivers comprises: one or more receive data registers for receiving data operatively coupled to the on-chip bit sliced bus 230 which operates to receive data on the selected data lines comprising the on-chip bit sliced bus 230, and one or more receive shift registers coupled to the one or more receive data registers for receiving data from the one or more receive data registers. Each of the one or more receive shift registers receives data in a format corresponding to a number of the selected data lines being used for the transfer and is operable to output the data in a standard format. Standard format is either the native format of that data type or the necessary format for that data type for use by the receiver. For example, native format may be as a 32 bit dword while the shifted, converted format may be 6 bits for substantially simultaneous transmission on six data bit lines.

A transmitter is preferably operable to transmit data on one or more data bit lines of the bit sliced bus 230 by storing data in one or more shift registers coupled to one or more data registers, wherein the one or more shift registers are operable to store data in a standard format. Then the data are shifted out of the one or more shift registers to one or more data registers, wherein each of the one or more shift registers outputs data in a format corresponding to a number of the selected data lines being used for the transfer. Data are stored in one or more data registers operatively coupled to the on-chip bit sliced bus 230 in response to the shifting. The one or more data registers then output the data to the selected and owned data lines comprising the on-chip bit sliced bus 230.

A receiver is preferably operable to receive data on one or more data bit lines of the bit sliced bus 230 by receiving the data from the selected data lines comprising the on-chip bit sliced bus 230 into one or more data registers coupled to the on-chip bit sliced bus 230. The one or more data registers receives the data in the format corresponding to the number of the selected data lines being used for the transfer. The one or more data registers store the data in response to the one or more data registers receiving the data from the data lines comprising the on-chip bit sliced bus 230. The one or more data registers then transfer the data to one or more shift registers coupled to the one or more data registers. The one or more shift registers store the data and shift the data out of the one or more shift registers in the standard format for the data that has just been transferred.

The bus interface logic 360 allows multiple sources for transactions to share the bit sliced bus 230 by dynamically or statically allocating either bit lines and/or sections of bursts to contain data from different transmitters with different receivers. This sharing of the bit sliced bus 230 is preferably accomplished by the bit transfer logic 380, comprised in transmitters which can place or remove their transaction from the correct bit line(s) at the correct time(s).

Figure 4:
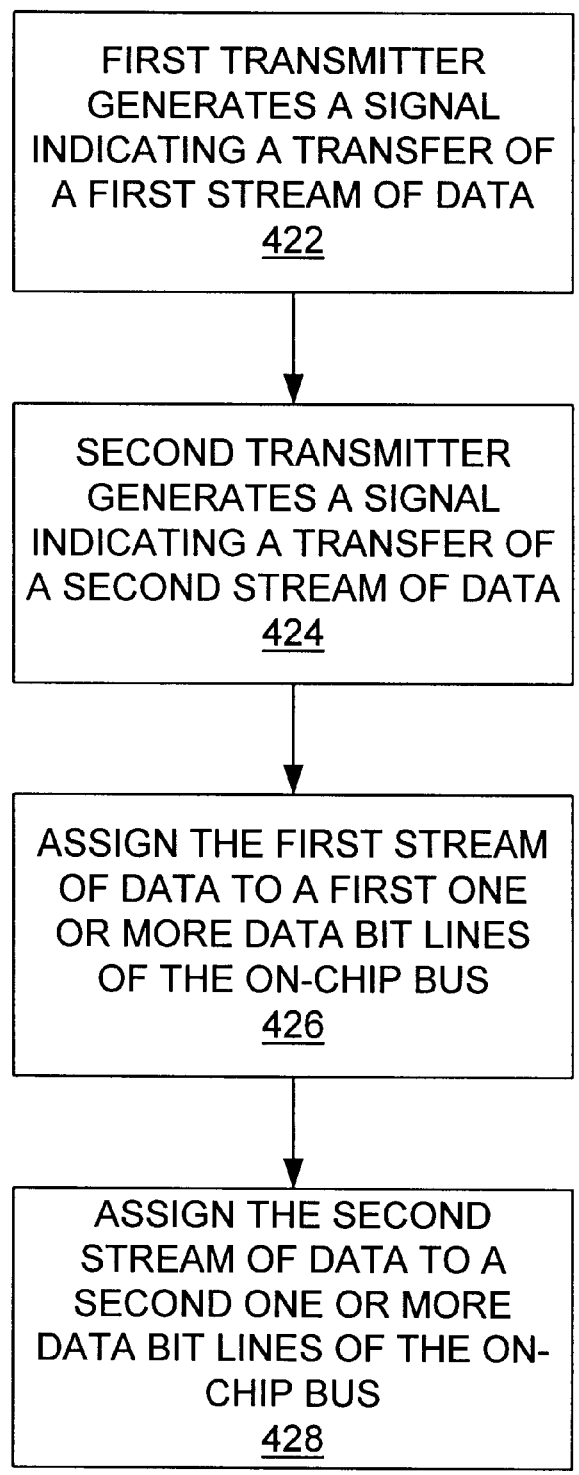
FIG. 4 is a flowchart diagram illustrating an embodiment of the operation of the bit slicing logic according to the present invention.

FIG. 4—Bit Sliced Bus Usage

Referring now to FIG. 4, the present invention also contemplates a method for transferring data on a bus in a computer chip using bit slicing techniques. This method presumes a computer chip similar to that shown in FIG. 1. As shown, in step 422, a first transmitter generates a signal indicating a transfer of a first stream of data. In step 424, a second transmitter generates a signal indicating a transfer of a second stream of data. In step 426 the bit transfer logic 380 assigns the first stream of data to a first one or more data bit lines of the bit sliced bus 230. In step 428 the bit transfer logic 380 assigns the second stream of data to a second one or more data bit lines of the bit sliced bus 230. It is noted that the first data stream is transferred on the first one or more data bit lines substantially concurrently with the second data stream being transferred on the second one or more data bit lines. It is also noted that various of the steps in the flowchart of FIG. 4 may be performed concurrently and/or in different order than that shown.

In one embodiment the on-chip bit sliced bus 230 transfers only periodic stream data, i.e., data streams which require periodic transfers for multimedia or communication purposes, as described above. Examples of periodic data include audio data, which is typically transmitted at 44,100 samples per second, video data, which is typically transmitted at 30 frames per second, or real-time communication streams at rates dependent on the transport media. In an alternate embodiment the on-chip bit sliced bus 230 is used for any of various types of multimedia or communications data transfers, including both periodic and aperiodic data.

In another embodiment a first transmitter comprising bit transfer logic 380 transmits one or more control signals on one or more control lines to set up a data transfer using only first selected data lines of the on-chip bit sliced bus 230. The first selected data lines preferably comprise only a subset of the plurality of data lines comprising the on-chip bit sliced bus 230. A first receiver comprising bit receive logic 370 receives the one or more control signals on one or more control lines. The first transmitter transmits data on the first selected data lines of the on-chip bit sliced bus 230 after the transmitting the signal on the one or more control lines to set up the data transfer. The first receiver receives the transmitted data on the first selected data lines of the on-chip bit sliced bus 230 after the first transmitter transmits the data on the first selected data lines of the on-chip bit sliced bus 230.

In another embodiment a second transmitter comprising bit transfer logic 380 also transmits additional one or more control signals on one or more control lines to set up a data transfer using only second selected data lines of the on-chip bit sliced bus 230. As before, the second selected data lines comprise only a second subset of the plurality of data lines comprising the on-chip bit sliced bus 230. A second receiver comprising bit receive logic 370 receives the additional one or more control signals on additional one or more control lines. The second transmitter transmits data on the second selected data lines of the on-chip bit sliced bus 230 after the transmitting the signal on the additional one or more control lines to set up the data transfer. The second receiver receives the transmitted data on the second selected data lines of the on-chip bit sliced bus 230 after the second transmitter transmits the data on the second selected data lines of the on-chip bit sliced bus 230.

The first transmitter and the second transmitter are preferably operable to transfer data bits on the first and second selected data lines, respectively, in an asynchronous fashion or a synchronous fashion or concurrently. The first transmitter is also preferably operable to transfer data bits on the first selected data lines at a first speed while the second transmitter is operable to transfer data bits on the second selected data lines at a second speed, wherein the second speed is different than the first speed. The data transfers by the first transmitter may be comprised of video data while the data transfers by the second transmitter are comprised of audio data. Transfer rates for the first transmitter and the second transmitter may be the same or may be different. The bus 230 may be completely synchronous or concurrent or may have different clocking for different bit lines or bit lanes.

Figure 5:
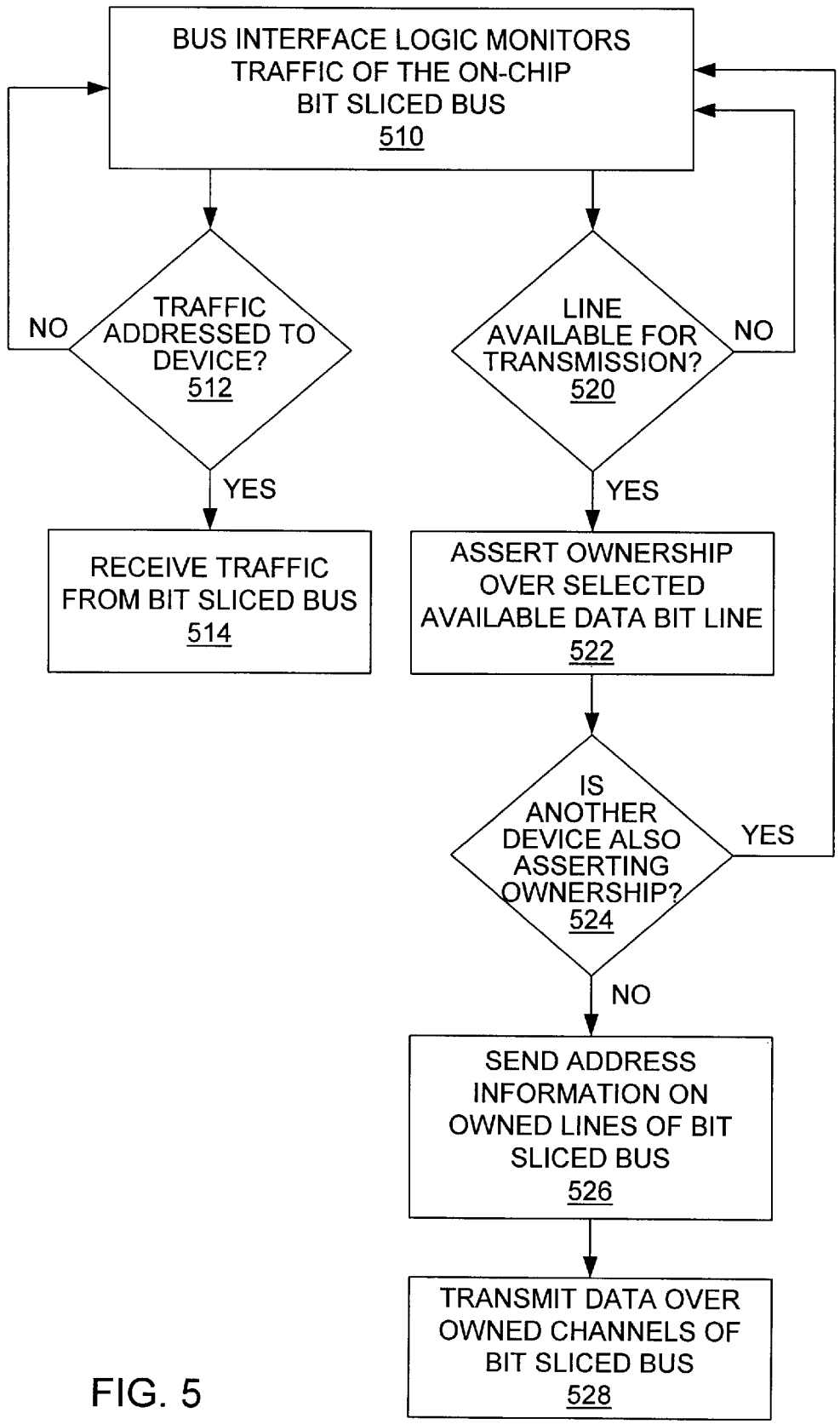
FIG. 5 is a flowchart diagram illustrating an embodiment of the operation of the modules utilizing bit slicing logic according to the present invention.

FIG. 5—Another Method of Usage of a Bit Sliced Bus

Referring now to FIG. 5, a block diagram illustrating another method of usage of the bit sliced bus 230 is given. The method is for non-centralized arbitration for transferring data on a bit sliced bus 230 on a computer chip wherein the on-chip bit sliced bus 230 comprises a plurality of data lines, wherein each of the data lines is operable to carry a data bit.

In step 510, the bus interface logic 360 each of the transmitters and receivers monitors traffic on the data bit lines of the bit sliced bus. In response to traffic or lack thereof on the data bit lines of the bit sliced bus, each of the transmitters and/or receivers determines in step 512 if the traffic is directed to an address mapped to the respective receiver, and the bit transmission logic 380 in each of the respective transmitters monitors traffic in step 520 on the one or more data bit lines to determine availability of each of the one or more data bit lines during times of inactivity. When there is data traffic on the bus, the receiver receives that traffic from the bus in step 514 if the receiver determines in step 512 that the traffic is addressed to the receiver.

If the transmitter that has data to transmit determines that there is a time when there is no traffic on one of more of the data bit lines of the bit sliced bus and that in step 520 one or more of the data bit lines is available for transmitting data, the bus interface logic 360 in a transmitter asserts ownership of the one or more data bit lines during the times of inactivity in step 522 in response to the bus interface logic 360 in the transmitter determining availability of the one or more data bit lines during times of inactivity. One way of asserting ownership would be to assert a selected available control line which corresponds to the selected data line(s). The transmitter receives transmission ownership information from its respective bus interface logic 360 in response to said its respective bus interface logic 360 asserting ownership of the one or more data bit lines in step 524. Should a collision occur between the transmitter and another transmitter, the bus interface logic 360 in the transmitter and any other transmitter deassert ownership of the one or more data bit lines during the times of inactivity in response to the bus interface logic 360 in another transmitter asserting ownership of the one or more data bit lines simultaneously. In cases of a collision, all prospective transmitters must return to step 522. Each transmitter has a different and/or random time-out value before attempting to reassert ownership over available data bit lines. In another embodiment, the highest priority valued transmitter to assert ownership simultaneously is granted ownership. All other transmitters must then deassert and wait for a later time of inactivity for their respective data transmission.

When the transmitter is the only device asserting ownership of the one or more data bit lines, the transmitter generates in step 526 address information on the bit sliced bus 230, or the address information may be contained within a packet header, for a data transmission. This address information may include any or all of the following: the one or more data bit lines used for the data transmission, a destination device or process identification designation, and a data transfer designation (label) providing to said destination device the purpose of the data transmission. The transmitter then sends in step 528 the data transmission on the bit sliced bus only on the one or more assigned data bit lines while the transmitter has ownership. It is noted that various of the steps in the flowchart of FIG. 5 may be performed concurrently and/or in different order than that shown.

In another embodiment a first transmitter comprising bit transfer logic 380 transmits one or more control signals on one or more control lines to set up a data transfer using only first selected data lines of the on-chip bit sliced bus 230. The first selected data lines comprise only a subset of the plurality of data lines comprising the on-chip bit sliced bus 230. A first receiver comprising bit receive logic 370 receives the one or more control signals on one or more control lines. The first transmitter transmits data on the first selected data lines of the on-chip bit sliced bus 230 after the transmitting the signal on the one or more control lines to set up the data transfer. The first receiver receives the transmitted data on the first selected data lines of the on-chip bit sliced bus 230 after the first transmitter transmits the data on the first selected data lines of the on-chip bit sliced bus 230.

In another embodiment, a second transmitter comprising bit transfer logic 380 also transmits an additional one or more control signals on one or more control lines to set up a data transfer using only second selected data lines of the on-chip bit sliced bus 230. The second selected data lines also comprise only a second subset of the plurality of data lines comprising the on-chip bit sliced bus 230. A second receiver comprising bit receive logic 370 receives the additional one or more control signals on additional one or more control lines. The second transmitter then transmits data on the second selected data lines of the on-chip bit sliced bus 230 after the transmitting the signal on the additional one or more control lines to set up the data transfer. The second receiver receives the transmitted data on the second selected data lines of the on-chip bit sliced bus 230 after the second transmitter transmits the data on the second selected data lines of the on-chip bit sliced bus 230.

The first transmitter and the second transmitter are preferably operable to transfer data bits on the first and second selected data lines, respectively, in a synchronous fashion or an asynchronous fashion or concurrently. The data transfers by the first transmitter may be comprised of video data while the data transfers by the second transmitter may be comprised of audio data. The one or more control lines and the additional one or more control lines of the above embodiment may comprise the same one or more control lines.

A transmitter transmitting preferably comprises:

storing data in one or more shift registers operatively coupled to one or more data registers, wherein the one or more shift registers are operable to store data in a standard format;

shifting the data out of the one or more shift registers to the one or more data registers in a format corresponding to a number of the selected data lines being used for the transfer;

storing the data in one or more data registers operatively coupled to the on-chip bit sliced bus 230 in response to the shifting; and the one or more data registers outputting the data from the one or more data registers to the selected, owned data lines comprising the on-chip bit sliced bus 230.

A receiver receiving preferably comprises:

receiving the data from the selected data lines comprising the on-chip bit sliced bus 230 into one or more data registers coupled to the on-chip bit sliced bus 230 in the format corresponding to the number of the selected data lines being used for the transfer;

storing the data in the one or more data registers in response to the one or more data registers receiving the data from the data lines comprising the on-chip bit sliced bus 230;

transferring the data from the one or more data registers to one or more shift registers coupled to the one or more data registers;

storing the data in the one or more shift registers; and shifting the data out of the one or more shift registers in the standard format.

In another embodiment, the bus interface logic 360 of a transmitter and/or receiver operates to selectively and dynamically assign data streams on selected ones of the data bit lines comprising the on-chip bit sliced bus 230. In other words, the bus interface logic 360 selectively assigns a data stream to a select set of one or more data bit lines at one point in the data transmission and may then reassign in a dynamic fashion which data bit lines are used for the transmission. In one embodiment, this selection process is active and continuous from the time the data transmission starts until the data transmission ends.

Data Flow on A Bit Sliced Bus

Figure 7:
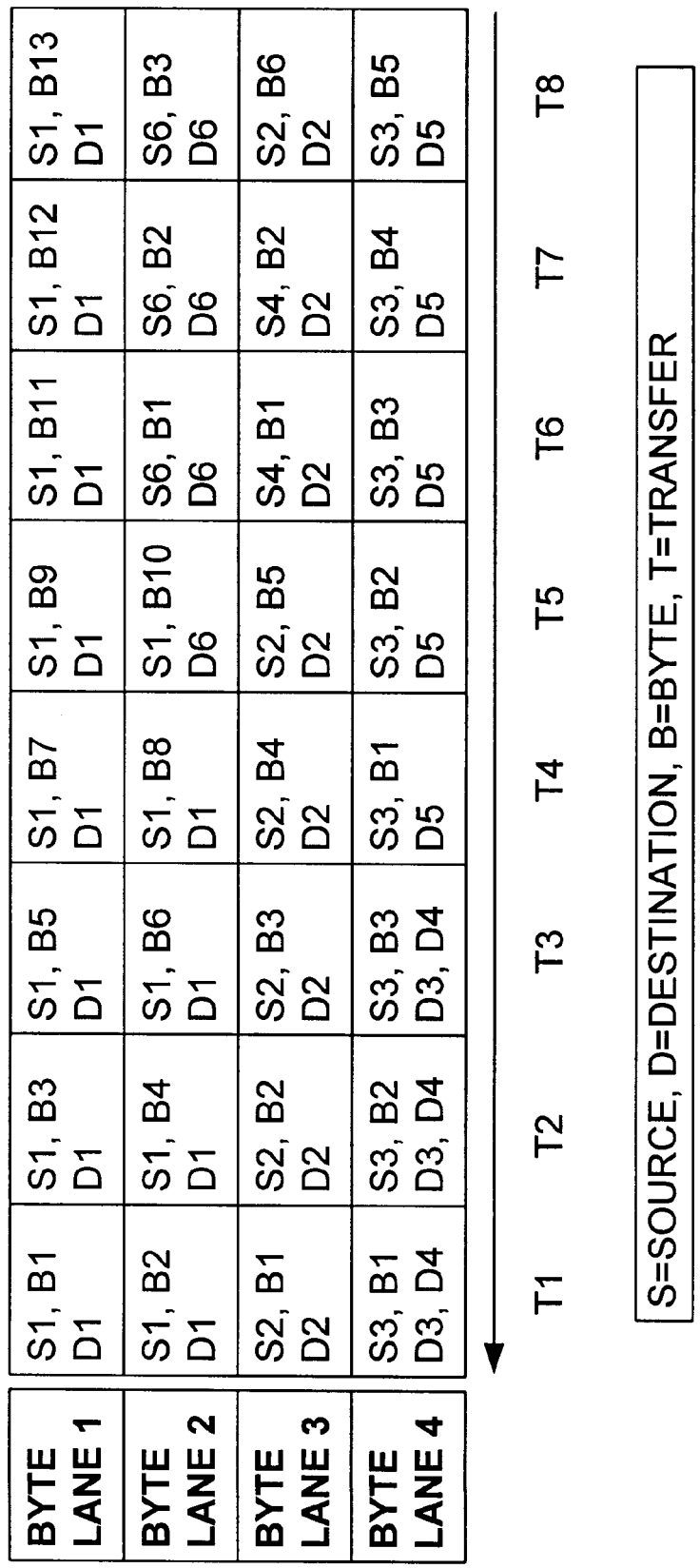

FIGS. 6 and 7 illustrate the type of information that can flow across the bit sliced bus using the present invention. In the embodiments of FIGS. 6 and 7, the bit sliced bus is divided into byte lanes which can independently transfer data according to the bit transfer logic 380. During transfer T1, each respective byte lane transfers a control block setting up the source and destination for all transfers within that byte lane for the next four transfer times. Thus each fifth transfer time is a new control block giving source and destination information on that byte lane. Other intervals of control blocks are also contemplated. With respect to FIG. 6, byte lane 1 and byte lane 2 each have a control block during transfer T1 indicating that the following transfers will be from source S1 to destination D1. During transfer Times T2–T5, bytes B1–B8 are transferred on byte lanes 1 and 2. During transfer T6, byte lane 1 has a control block indicating transfer from source S1 to destination D1, while byte lane 2 has a control logic indicating a transfer from source S6 to destination D6. Byte lane 1 continues the source S1 to destination D1 transfer by transferring byte B9, byte B10, byte B11, and byte B12 during transfer T7, T8, T9 and T10, respectively. Byte lane 2 has interrupted the source S1 to destination D1 transfer with the transfer from source S6 to destination D6 with bytes B1–B4 being transferred during transfers T7–T10.

Byte lane 3 shows the following transfers. During transfer T1, a control block indicating a transfer from source S2 to destination D2, followed by bytes B1–B4 during transfers T2–T5. During transfer T6, a control block indicates the continuation of the transfer between source S2 and destination D2. Transfers completed with byte 5 during transfer T7. Note that on byte lane 3, during transfers T8 through T10, no data are transferred. Byte lane 4 illustrates a broadcast transfer from source S3 to the dual destinations of D3 and D4.

In FIG. 7, Sources and Destination transactions for sources S2 through S6 occur while source S1 is transferring.

In addition, source S1 is able to relinquish one byte lane to allow source S6 to begin transmitting to destination D6 and source S2 is able to allow two transfers by source S4 before resuming its transfer. Note that while the embodiment of the bit sliced bus shown in FIG. 6 has slots where no data are transferred, the embodiment of FIG. 7 illustrates a data packed bus with data transfers for each available transfer slots. In other contemplated embodiments, the control blocks are sent over separate control lines or are sent for each transfer or only as necessary. Other modifications include slicing the bus at other granularities.

This methodology optimizes the bus utilization by packing information into every transfer on the bus. The system arbitrates for both time and bit line access rights either on a continual basis or by setting up pre-defined or agreed upon utilization patterns which allow either intelligent entities to transact or intelligent DMA devices to pack and unpack information transactions.

Conclusion

Therefore, the present invention comprises an improved system for interconnecting modules on an integrated circuit in an on-chip network. Bit slicing logic for performing transfers on different byte lanes of the on-chip bit sliced bus 230 is comprised in either each of the individual modules or centralized in a bus controller.

Although the system of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A computer chip which performs data transfers using selected data lines of an on-chip bus, comprising:

an on-chip bus comprised on said chip comprising a plurality of data lines, wherein each of said data lines is operable to carry a data bit;

one or more transmitters comprised on said chip coupled to said on-chip bus operable for transmitting data on said on-chip bus;

one or more receivers comprised on said chip coupled to said on-chip bus operable for receiving data transferred on said on-chip bus;

wherein each of said one or more transmitters includes bit transfer logic which operatively couples to said on-chip bus, wherein said bit transfer logic for each transmitter operates to selectively assign data streams on selected ones of said data lines comprising said on-chip bus;

wherein the selected ones of said data lines comprising the on-chip bus includes less than all of said data lines; and wherein each of said one or more receivers includes bit receive logic operable to receive said assigned data streams on said selected ones of said data lines comprising said on-chip bus.

2. The computer chip of claim 1, wherein said bit transfer logic comprised on each of said one or more transmitters is further operable to selectively assign data streams on selected pluralities of data lines comprising the on-chip bus; and wherein the selected pluralities of said data lines comprising the on-chip bus includes less than all of said data lines.

3. The computer chip of claim 1, wherein said on-chip bus further comprises a plurality of control lines, wherein each of said control lines is operable to carry a control signal;

wherein said control signals are used to identify said selected ones of said data lines comprising the on-chip bus which are used for data transfers.

4. The computer chip of claim 3, wherein one or more of said control lines are useable as data lines, wherein said one or more of said control lines useable as data lines are operable to carry data bits.

5. The computer chip of claim 3, wherein said plurality of control lines include one or more of: Clear to Send, Ready and Clock control lines.

6. The computer chip of claim 3, wherein said plurality of control lines include one or more serial control lines for indicating data transfers on single data lines of said on-chip bus.

7. The computer chip of claim 1, wherein said one or more transmitters comprise a plurality of transmitters;

wherein two or more transmitters are operable to set up data transfers on different selected data lines of said on-chip bus in a synchronous fashion;

wherein said two or more transmitters are operable to transfer data bits on said different selected data lines substantially simultaneously in a synchronous fashion.

8. The computer chip of claim 1, wherein said one or more transmitters comprise a plurality of transmitters;

wherein a first transmitter is operable to set up data transfers on first selected one or more data lines of said on-chip bus;

wherein a second transmitter is operable to set up data transfers on second selected one or more data lines of said on-chip bus;

wherein said first transmitter and said second transmitter are operable to transfer data bits on said first and second selected data lines, respectively, in a synchronous fashion.

9. The computer chip of claim 8, wherein said first transmitter is operable to transfer video data on said first selected data lines;

wherein said second transmitter is operable to transfer audio data on said second selected data lines.

10. The computer chip of claim 1, wherein said one or more transmitters comprise a plurality of transmitters;

wherein a first transmitter is operable to set up data transfers on first selected one or more data lines of said on-chip bus;

wherein a second transmitter is operable to set up data transfers on second selected one or more data lines of said on-chip bus;

wherein said first transmitter and said second transmitter are operable to transfer data bits on said first and second selected data lines, respectively, in an asynchronous fashion.

11. The computer chip of claim 10, wherein said first transmitter is operable to transfer data bits on said first selected data lines at a first speed;

wherein said second transmitter is operable to transfer data bits on said second selected data lines at a second speed, wherein said second speed is different than said first speed.

12. The computer chip of claim 10, wherein said first transmitter is operable to transfer video data on said first selected data lines;

wherein said second transmitter is operable to transfer audio data on said second selected data lines.

13. The computer chip of claim 1, wherein said bit transfer logic comprised in each of said one or more transmitters comprises:

one or more data registers for storing data, wherein said one or more data registers are operatively coupled to the on-chip bus and operate to output data to said selected data lines comprising the on-chip bus;

one or more shift registers operatively coupled to the one or more data registers for storing data and for outputting data to the one or more data registers, wherein each of said one or more shift registers is operable to output data in a format corresponding to a number of said selected data lines being used for the transfer.

14. The computer chip of claim 13, wherein said bit receive logic comprised in each of said one or more receivers comprises:

one or more receive data registers for receiving data, wherein said one or more receive data registers are operatively coupled to the on-chip bus and operate to receive data on said selected data lines comprising the on-chip bus;

one or more receive shift registers operatively coupled to the one or more receive data registers for receiving data from the one or more receive data registers, wherein each of said one or more receive shift registers receives data in a format corresponding to a number of said selected data lines being used for the transfer and is operable to output said data in a standard format.

15. The computer chip of claim 1, wherein at least one of said one or more transmitters comprises a CPU.

16. The computer chip of claim 1, wherein at least one of said one or more receivers comprises a memory.

17. The computer chip of claim 1, wherein the computer chip comprises one or more devices which operate as both transmitters and receivers.

18. A method for transferring data using selected data lines of an on-chip bus in a computer chip, wherein the on-chip bus comprises a plurality of data lines, wherein each of said data lines is operable to carry a data bit, the method comprising:

a first transmitter comprising bit transfer logic transmitting one or more control signals on one or more control lines to set up a data transfer using only first selected data lines of the on-chip bus, wherein said first selected data lines comprise only a subset of said plurality of data lines comprising the on-chip bus;

a first receiver comprising bit receive logic receiving said one or more control signals on one or more control lines;

the first transmitter transmitting data on said first selected data lines of the on-chip bus after said transmitting the signal on the one or more control lines to set up the data transfer;

the first receiver receiving said transmitted data on said first selected data lines of the on-chip bus after the first transmitter transmitting said data on said first selected data lines of the on-chip bus.

19. The method of claim 18, further comprising:

a second transmitter comprising bit transfer logic transmitting additional one or more control signals on one or more control lines to set up a data transfer using only second selected data lines of the on-chip bus, wherein said second selected data lines comprise only a second subset of said plurality of data lines comprising the on-chip bus;

a second receiver comprising bit receive logic receiving said additional one or more control signals on additional one or more control lines;

the second transmitter transmitting data on said second selected data lines of the on-chip bus after said transmitting the signal on said additional one or more control lines to set up the data transfer;

the second receiver receiving said transmitted data on said second selected data lines of the on-chip bus after the second transmitter transmitting said data on said second selected data lines of the on-chip bus;

wherein said first transmitter and said second transmitter are operable to transfer data bits on said first and second selected data lines, respectively, in a synchronous fashion.

20. The method of claim 19, wherein said data transfers by said first transmitter are comprised of video data; and wherein said data transfers by said second transmitter are comprised of audio data.

21. The method of claim 19, wherein said one or more control lines and said additional one or more control lines comprise the same one or more control lines.

22. The method of claim 18, further comprising:

a second transmitter comprising bit transfer logic transmitting additional one or more control signals on one or more control lines to set up a data transfer using only second selected data lines of the on-chip bus, wherein said second selected data lines comprise only a second subset of said plurality of data lines comprising the on-chip bus;

a second receiver comprising bit receive logic receiving said additional one or more control signals on additional one or more control lines;

the second transmitter transmitting data on said second selected data lines of the on-chip bus after said transmitting the signal on said additional one or more control lines to set up the data transfer; and the second receiver receiving said transmitted data on said second selected data lines of the on-chip bus after the second transmitter transmitting said data on said second selected data lines of the on-chip bus;

wherein said first transmitter and said second transmitter are operable to transfer data bits on said first and second selected data lines, respectively, in an asynchronous fashion.

23. The method of claim 22, wherein said first transmitter is operable to transfer data bits on said first selected data lines at a first speed;

wherein said second transmitter is operable to transfer data bits on said second selected data lines at a second speed, wherein said second speed is different than said first speed.

24. The method of claim 22, wherein said data transfers by said first transmitter are comprised of video data; and wherein said data transfers by said second transmitter are comprised of audio data.

25. The method of claim 18, wherein said transmitting comprises:

storing data in one or more shift registers, wherein said one or more shift registers are coupled to one or more data registers, wherein said one or more shift registers are operable to store data in a standard format;

shifting said data out of said one or more shift registers to said one or more data registers, wherein each of said one or more shift registers outputs data in a format corresponding to a number of said selected data lines being used for the transfer;

storing said data in the one or more data registers in response to said shifting, wherein said one or more data registers are coupled to the on-chip bus;

the one or more data registers outputting said data to said selected data lines comprising the on-chip bus.

26. The method of claim 25, wherein said receiving comprises:

the one or more data registers receiving said data from said selected data lines comprising the on-chip bus, wherein said one or more data registers are coupled to said on-chip bus, wherein said one or more data registers receives said data in said format corresponding to said number of said selected data lines being used for the transfer;

the one or more data registers storing said data in response to said one or more data registers receiving said data from said data lines comprising the on-chip bus;

the one or more data registers transferring said data to said one or more shift registers coupled to the one or more data registers;

the one or more shift registers storing said data; and the one or more shift registers shifting said data out of the one or more shift registers in said standard format.

27. The method of claim 18, wherein said receiving comprises:

one or more data registers receiving said data from said selected data lines comprising the on-chip bus, wherein said one or more data registers are coupled to said on-chip bus, wherein said one or more data registers receives said data in a format corresponding to a number of said selected data lines being used for the transfer;

the one or more data registers storing said data in response to said one or more data registers receiving said data from said data lines comprising the on-chip bus;

the one or more data registers transferring said data to one or more shift registers coupled to the one or more data registers;

the one or more shift registers storing said data; and the one or more shift registers shifting said data out of the one or more shift registers in a standard format.

28. A computer chip which performs data transfers using selected data lines of an on-chip bus, comprising:

an on-chip bus comprised on said chip comprising a plurality of data lines, wherein each of said data lines is operable to carry a data bit;

one or more transmitters comprised on said chip coupled to said on-chip bus operable for transmitting data on said on-chip bus;

one or more receivers comprised on said chip coupled to said on-chip bus operable for receiving data transferred on said on-chip bus;

wherein each of said one or more transmitters includes bit transfer logic which operatively couples to said on-chip bus, wherein said bit transfer logic for each transmitter operates to selectively assign data streams on selected ones of said data lines comprising said on-chip bus;

wherein each of said one or more receivers includes bit receive logic operable to receive said assigned data streams on said selected ones of said data lines comprising said on-chip bus;

wherein one or more of said data lines are useable as control lines to identify said selected ones of said data lines comprising the on-chip bus which are used for data transfers.

29. The computer chip of claim 28, wherein said on-chip bus further comprises a plurality of control lines, wherein each of said control lines is operable to carry a control signal;

wherein said control signals are used to identify said selected ones of said data lines comprising the on-chip bus which are used for data transfers.

30. The computer chip of claim 29, wherein one or more of said control lines are useable as data lines, wherein said one or more of said control lines useable as data lines are operable to carry data bits.

31. The computer chip of claim 29, wherein said plurality of control lines include one or more of: Clear to Send, Ready and Clock control lines.

32. The computer chip of claim 29, wherein said plurality of control lines include one or more serial control lines for indicating data transfers on single data lines of said on-chip bus.

33. The computer chip of claim 28, wherein said one or more transmitters comprise a plurality of transmitters;

wherein two or more transmitters are operable to set up data transfers on different selected data lines of said on-chip bus in a synchronous fashion;

wherein said two or more transmitters are operable to transfer data bits on said different selected data lines substantially simultaneously in a synchronous fashion.

34. The computer chip of claim 28, wherein said one or more transmitters comprise a plurality of transmitters;

wherein a first transmitter is operable to set up data transfers on first selected one or more data lines of said on-chip bus;

wherein a second transmitter is operable to set up data transfers on second selected one or more data lines of said on-chip bus;

wherein said first transmitter and said second transmitter are operable to transfer data bits on said first and second selected data lines, respectively, in a synchronous fashion.

35. The computer chip of claim 34, wherein said first transmitter is operable to transfer video data on said first selected data lines;

wherein said second transmitter is operable to transfer audio data on said second selected data lines.

36. The computer chip of claim 28, wherein said one or more transmitters comprise a plurality of transmitters;

wherein a first transmitter is operable to set up data transfers on first selected one or more data lines of said on-chip bus;

wherein a second transmitter is operable to set up data transfers on second selected one or more data lines of said on-chip bus;

wherein said first transmitter and said second transmitter are operable to transfer data bits on said first and second selected data lines, respectively, in an asynchronous fashion.

37. The computer chip of claim 36, wherein said first transmitter is operable to transfer data bits on said first selected data lines at a first speed;

wherein said second transmitter is operable to transfer data bits on said second selected data lines at a second speed, wherein said second speed is different than said first speed.

38. The computer chip of claim 36, wherein said first transmitter is operable to transfer video data on said first selected data lines;

wherein said second transmitter is operable to transfer audio data on said second selected data lines.

39. The computer chip of claim 28, wherein said bit transfer logic comprised in each of said one or more transmitters comprises:

one or more data registers for storing data, wherein said one or more data registers are operatively coupled to the on-chip bus and operate to output data to said selected data lines comprising the on-chip bus;

one or more shift registers operatively coupled to the one or more data registers for storing data and for outputting data to the one or more data registers, wherein each of said one or more shift registers is operable to output data in a format corresponding to a number of said selected data lines being used for the transfer.

40. The computer chip of claim 39, wherein said bit receive logic comprised in each of said one or more receivers comprises:

one or more receive data registers for receiving data, wherein said one or more receive data registers are operatively coupled to the on-chip bus and operate to receive data on said selected data lines comprising the on-chip bus;

one or more receive shift registers operatively coupled to the one or more receive data registers for receiving data from the one or more receive data registers, wherein each of said one or more receive shift registers receives data in a format corresponding to a number of said selected data lines being used for the transfer and is operable to output said data in a standard format.

41. The computer chip of claim 28, wherein at least one of said one or more transmitters comprises a CPU.

42. The computer chip of claim 28, wherein at least one of said one or more receivers comprises a memory.

43. The computer chip of claim 28, wherein the computer chip comprises one or more devices which operate as both transmitters and receivers.

* * * * *